United States Patent [19]
Burkhead et al.

[11] Patent Number: 6,010,548
[45] Date of Patent: Jan. 4, 2000

[54] SPACED POCKET FILTER ASSEMBLY AND METHOD OF MANUFACTURING SAME

[75] Inventors: Robert B. Burkhead, Hopkinsville, Ky.; Klaus Schwöbel, Schriesheim; Udo Michaelis, Alsbach-Hähnlein, both of Germany

[73] Assignee: Freudenberg Nonwovens Limited Partnership, Durham, N.C.

[21] Appl. No.: 09/016,664

[22] Filed: Jan. 30, 1998

[51] Int. Cl.$^7$ .................................................. B01D 46/02
[52] U.S. Cl. ................... 55/378; 55/381; 55/382; 55/341.7; 55/529; 55/DIG. 5; 55/DIG. 12; 156/204; 156/227; 156/474
[58] Field of Search .......................... 55/381, 382, 341.6, 55/341.7, DIG. 12, 529, DIG. 5, 378; 156/204, 227, 474

[56] References Cited

U.S. PATENT DOCUMENTS

| | | | |
|---|---|---|---|
| 3,190,059 | 6/1965 | Bauder et al. | 55/382 |
| 3,309,848 | 3/1967 | Schwab | 55/381 |
| 3,422,602 | 1/1969 | Janson | 55/378 |
| 3,774,375 | 11/1973 | Smith . | |
| 3,830,042 | 8/1974 | MacDonnell . | |
| 3,883,330 | 5/1975 | Margraf . | |
| 4,056,375 | 11/1977 | Ringel et al. . | |
| 4,080,185 | 3/1978 | Richter et al. | 55/381 |
| 4,154,688 | 5/1979 | Pall . | |
| 4,272,267 | 6/1981 | Kamps et al. | 55/DIG. 12 |
| 4,356,011 | 10/1982 | Day et al. . | |
| 4,799,944 | 1/1989 | Dixon et al. | 55/529 |
| 4,801,317 | 1/1989 | Agnew et al. . | |
| 4,925,561 | 5/1990 | Ishii et al. | 55/DIG. 12 |
| 4,940,500 | 7/1990 | Tadokoro et al. | 156/204 |
| 5,066,400 | 11/1991 | Rocklitz et al. . | |
| 5,215,609 | 6/1993 | Sanders . | |
| 5,427,597 | 6/1995 | Osendorf . | |
| 5,554,203 | 9/1996 | Borkent et al. | 55/378 |
| 5,888,262 | 3/1999 | Kahler | 55/DIG. 5 |

FOREIGN PATENT DOCUMENTS

1407868B2  12/1977  Germany .......................... 55/DIG. 12

OTHER PUBLICATIONS

Product Brochure entitled Pocket Filter Type F50.
Product Brochure entitled Pocket Filter Type MF90.
Product Brochure entitled Pocket Filter Type T60.

*Primary Examiner*—David A. Simmons
*Assistant Examiner*—Minh-Chau T. Pham
*Attorney, Agent, or Firm*—Weingarten, Schurgin, Gagnebin & Hayes LLP

[57] ABSTRACT

A spaced pocket filter assembly has a pocket secured to a holding frame and a spacing member within the pocket made of a single sheet of material. The spacing member has an alternately folded Z or zig zag configuration and is secured to the interior of the pocket along each of the fold lines. The pocket assembly can be manufactured by interposing a roll of a sheet media for the spacing member between rolls of filter media for the pocket. The spacing member media is folded into the Z or zig zag configuration, layered between the pocket media, and secured to the pocket media continuously along the fold lines.

13 Claims, 3 Drawing Sheets

SPACED POCKET FILTER ASSEMBLY AND METHOD OF MANUFACTURING SAME

CROSS REFERENCE TO RELATED APPLICATIONS

None.

STATEMENT REGARDING FEDERALLY SPONSORED RESEARCH OR DEVELOPMENT

Not Applicable.

BACKGROUND OF THE INVENTION

Pocket filter assemblies are useful for many applications in which a gas such as air must be filtered. In these types of filters, a number of pockets made of a filter material and having a wide open end or mouth are mounted within a rectangular holding frame. Air or another gas to be filtered flows into the open end and passes through the filter material of the pocket. Particulates in the gas are trapped in the filter material. Spacers are provided within each pocket to keep each pocket from ballooning into the adjacent pockets, which would reduce the surface area available for filtering the gas.

An exemplary pocket filter assembly is disclosed in U.S. Pat. No. 4,056,375, the disclosure of which is incorporated by reference herein. See also FIG. 1. This filter requires a significant amount of work to assemble, since the spacers must be individually assembled into a tubular form and then must be secured to the pocket by stitching, welding, or cementing.

BRIEF SUMMARY OF THE INVENTION

The present invention provides a pocket filter assembly comprising a pocket and a spacing member within the pocket made of a single sheet of material. The pocket is formed by two sheets of gas permeable filter media sealed along three sides of the periphery and open along one side to form a mouth. The spacing member has an alternately folded Z or zig zag configuration and is oriented within the pocket with the folds extending from proximate the open mouth of the pocket to proximate the pocket bottom sealed at the periphery opposite the open mouth. The spacing member is secured within the pocket along each of the fold lines alternately to opposite inside faces of the pocket, such as by ultrasonic welding.

The pocket assembly can be readily manufactured by interposing a roll of sheet media for the spacing member between rolls of filter media for the pocket. The spacing member media, which is supplied on a wider roll than the filter media, is folded into the Z or zig zag configuration and then fed between the filter media to form a multilayered assemblage. The spacing member is then secured to the filter media continuously along the fold lines, such as by ultrasonic welding or other suitable securing methods. The layered assembly is then sealed continuously along the longitudinal sides and transversely at spaced intervals to form the closed pocket bottom and is severed adjacent to each closed bottom to provide separated individual pocket assemblies. The pocket assemblies are then affixed to a holding frame.

The pocket filter assembly of the present invention is advantageous in that the Z or zig zag shape of the spacing member helps to ensure laminar gas flow through the pocket. Laminar flow ensures a uniform particulate loading within the filter, thereby optimizing filter use. Additionally, the Z or zig zag shape is stiffer than prior art spacers, which ensures a longer life for the pocket filter assembly in turbulent or otherwise aggressive environments. Further, the one-piece configuration of the spacing member results in a faster, more efficient manufacturing process and a more consistent and hence reliable product.

BRIEF DESCRIPTION OF THE DRAWINGS

The invention will be more fully understood from the following detailed description taken in conjunction with the accompanying drawings in which.

DETAILED DESCRIPTION OF THE INVENTION

Figure 2:
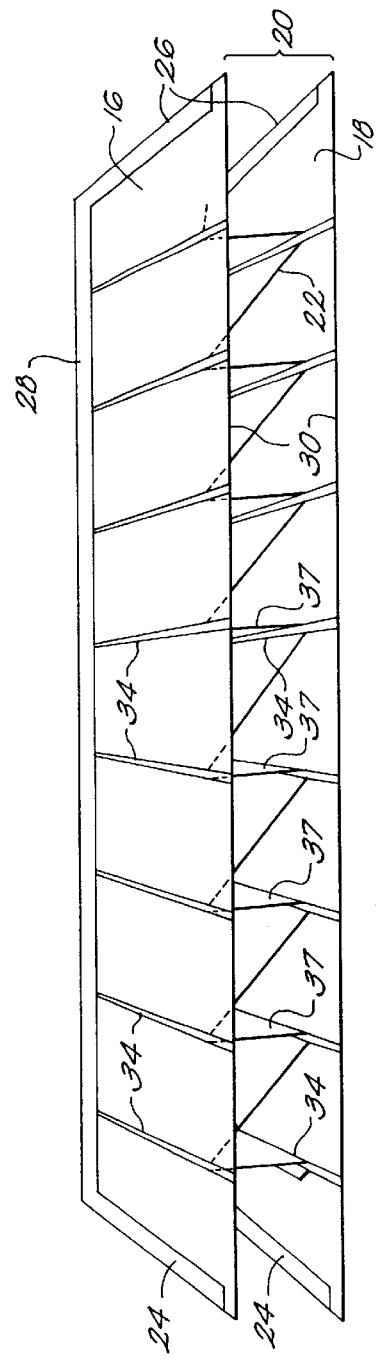
FIG. 2 is a partially exploded perspective view of a pocket assembly according to the present invention.
Figure 3:
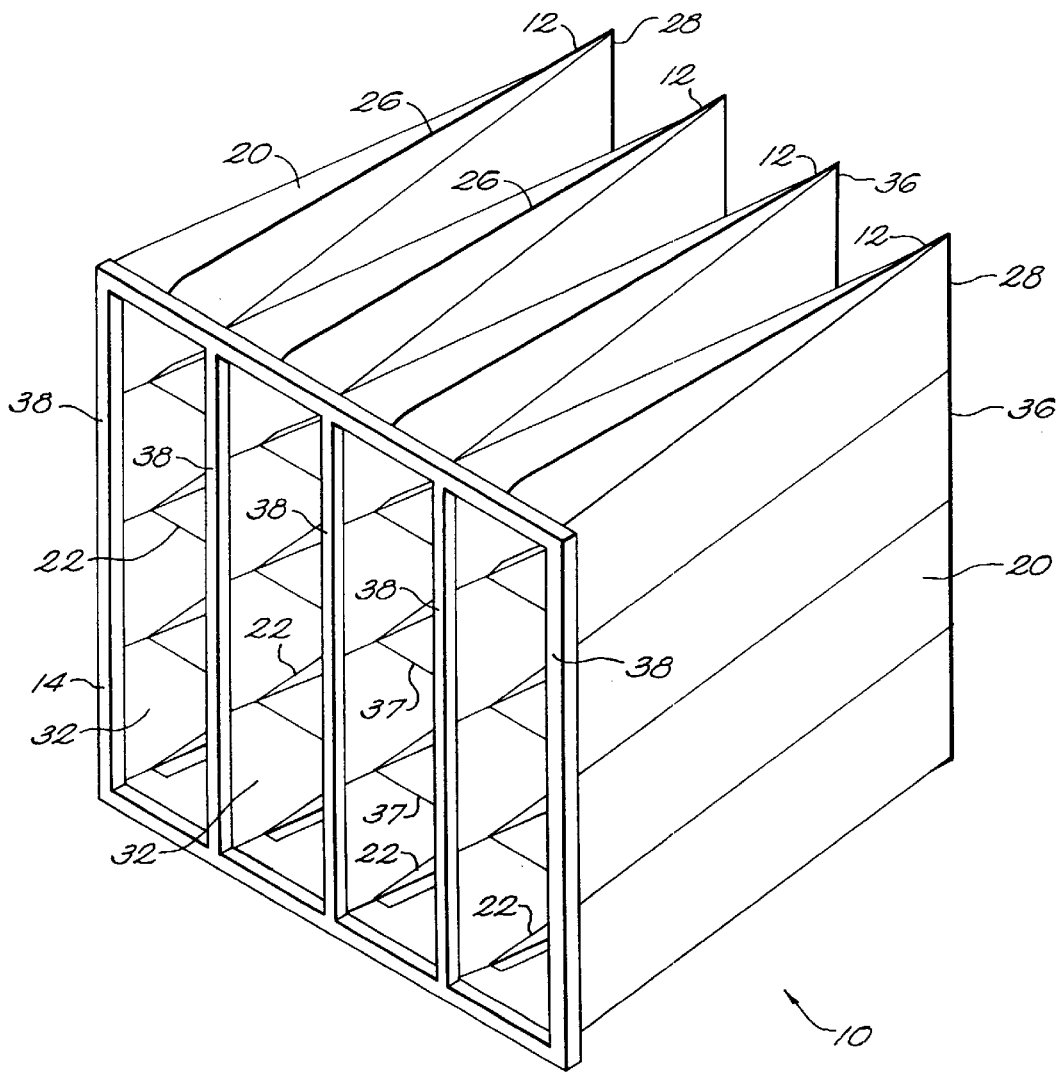
FIG. 3 is an isometric view of a pocket filter assembly according to the present invention.

Referring to FIG. 3, the pocket filter assembly 10 according to the present invention is formed of a plurality of pocket assemblies 12 mounted to a holding frame 14. Each pocket assembly, shown more particularly in FIG. 2, comprises a first sheet 16 of a gas permeable filter media and a second sheet 18 of a gas permeable filter media, joined to form a pocket 20, and a spacing member 22 located within the pocket.

The first and second sheets 16, 18 of the filter media of the pocket are preferably the same. Typically, the sheets have a rectangular or slightly tapered shape, and the two sheets are secured to each other along three sides 24, 26, 28 of the periphery and are left unsecured along a fourth side 30 to form a pocket configuration having one open side or mouth 32. For clarity, the pocket assembly shown in FIG. 2 is illustrated in an unsecured configuration about the sides 24, 26, 28 of the periphery. The peripheral sealing must be sufficient to prevent leakage of particulates through the periphery during filtering.

The spacing member 22 is formed of a sheet-like media folded alternately along a plurality of parallel fold lines 34 into a Z or a zig zag configuration. The spacing member 22 is oriented within the pocket with the folds lines 34 extending from proximate the open mouth 32 to proximate the bottom 36 of the pocket opposite the open mouth. The spacing member 22 is secured to the interior of the pocket along each of the fold lines 34. In this manner, the spacing member is secured within the pocket alternately to opposite inside faces of the pocket 20. Preferably, the cross pieces 37 of the spacing member are generally perpendicular to the first and second sheets 16, 18 of filter media to provide the greatest resistance to collapse of the filter media. The spacing media need not be gas permeable, and can even be a gas-impermeable sheet of plastic if desired. It should be sufficiently strong to retain its shape under pressure.

As illustrated in FIG. 3, the pocket assembly 12 is secured at its mouth 32 to a rectangular holding frame 14 configured to hold the mouth of the pocket open. Typically, a number of pocket assemblies 12 are secured next to each other in a single frame 14 having a number of cross pieces 38. In use, the frame is mounted within a gas flow path with the open mouth of the pockets on the upstream end, such that gas to be filtered enters the open mouths, flows into the pockets, and passes through the pores of the filter media comprising the pockets.

Figure 4:
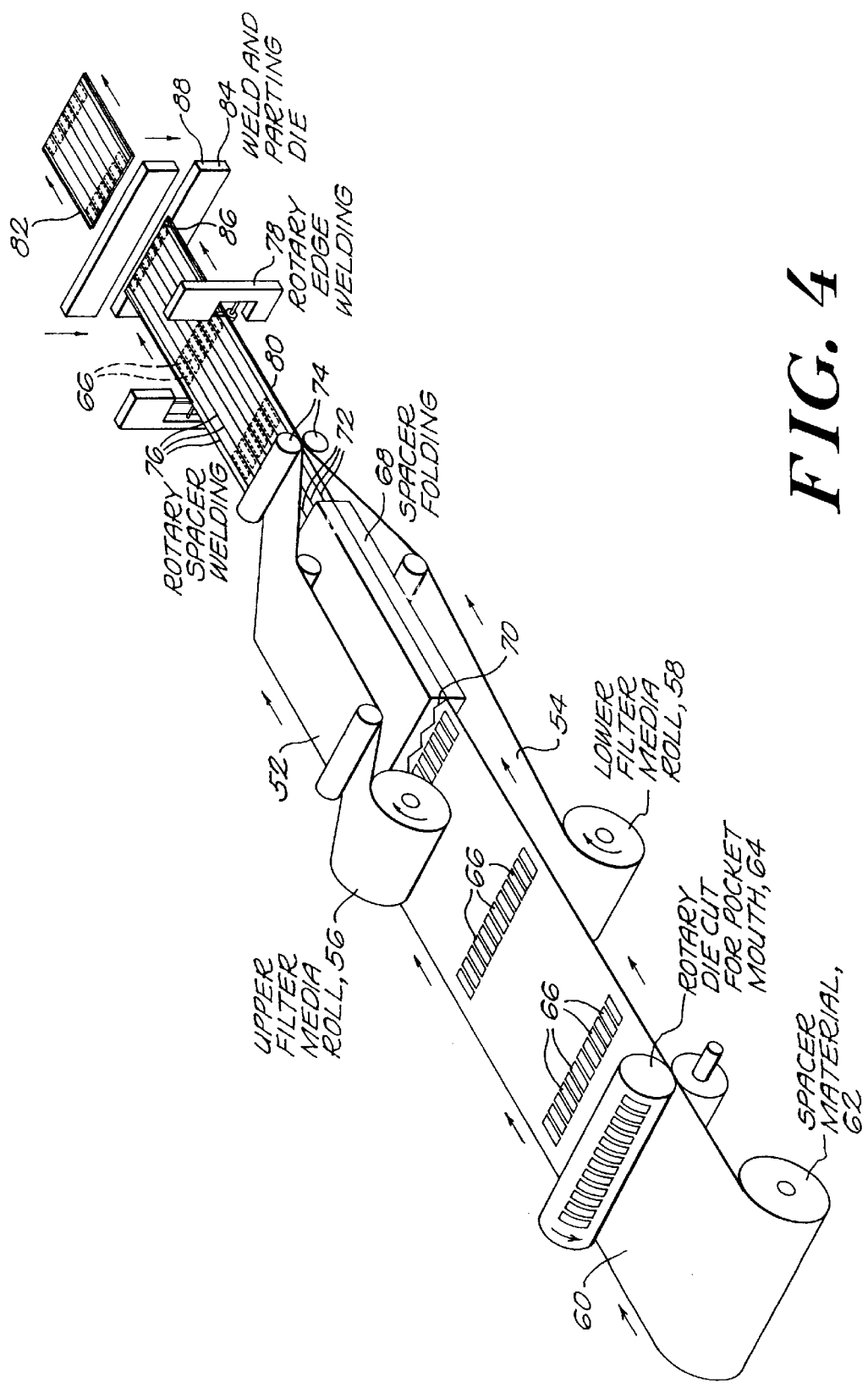
FIG. 4 is a schematic view of a process for manufacturing a pocket filter assembly according to the present invention.

Referring to FIG. 4, in assembly, the two sheets 52, 54 of filter media for the pocket are provided as continuous sheets on upper and lower rolls 56, 58. The sheet media 60 for the spacing member is also provided as a continuous sheet on a roll 62.

As it comes off the roll 62, the spacing media 60 passes first through a device such as a rotary die 64 which cuts a transversely extending row of openings 66. The openings facilitate fastening of the pocket assembly 12 to the holding frame 14 and prevent bunching of the spacing member 22 at the bottom 36 of the pocket. The openings 66 are spaced apart longitudinally a distance equal to the desired length of the pocket from the mouth 32 to the bottom 36.

The spacing media 60 then passes through a spacer folding apparatus 68 which folds the media alternately along parallel fold lines into the Z or zig zag shape. The folds are located between each of the openings 66. The folding apparatus includes guide channels 70 which progress from relatively open folds at the upstream end to relatively closed folds at the downstream end. The folding apparatus further includes a plurality of cantilevered fingers 72 extending from the downstream end. The cantilevered fingers hold the spacing media 60 in the folded configuration as it is fed between the filter media 52, 54 and further hold the spacing media adjacent the associated first or second filter media along the fold lines for welding. The spacing media 60 is wider than the filter media 52, 54 on the upper and lower rolls. The folding operation reduces the width of the spacing media to somewhat less than the width of the media on the upper and lower rolls, so that the spacing member fits within the pocket 20.

The filter and spacing media are fed together, with the spacing media intermediate the first and second filter media between an attachment apparatus 74 which secures the spacing media to the filter media continuously along the fold lines of the spacing member. The attachment apparatus may comprise a welding apparatus for ultrasonic welding, radio frequency (RF) welding, heat welding, or vibration welding. Alternatively, the spacing media can be attached to the filter media in any other suitable manner, such as with adhesive. The welding apparatus 74 can constitute a single upper and a single lower roller, as illustrated, or may constitute individual rollers for each weld line. Each weld line 76 is placed between the rectangular openings 66 cut into the spacing media. In this manner, only a narrow strip of spacing media, substantially only the width of the weld line, extends to the open mouth and to the bottom of the pocket, as best indicated in FIG. 2. This facilitates molding the holding frame about the pocket mouth and prevents bunching of the spacing media in the bottom of the pocket.

Next the filter and spacing media pass an edge sealing apparatus 78 which secures together the two opposed longitudinal side edges 80, 82 of the three media. Other sealing methods can be used. Typically, the edge sealing apparatus is a rotary welding apparatus capable ultrasonic or another form of welding. If a tapered pocket configuration is desired, as shown in FIG. 3, the edge sealing apparatus can be mounted for transverse motion as well. In this case, the edge sealing apparatus would alternately move first inwardly a short distance and then back outwardly as the media passed by to impart the taper to the longitudinal edge seals.

The filter and spacing media then pass a sealing apparatus 84 which seals the media together along a line 86 transverse to the rolled length of the media. The seal extends across the row of openings 66 in the spacing media. A cutting or parting apparatus 88, which may be integrated with the sealing apparatus 84, then cuts the media adjacent to the transverse seal to form individual pockets. Typically, the sealing apparatus is a welding apparatus capable of ultrasonic welding or another form of welding. Other sealing methods can be used.

The pocket assembly 12 is attached to the holding frame 14 in any suitable manner known in the art, as by insert molding a plastic material around the mouth of the pockets.

The filter media 52, 54 comprising the pocket 20 is typically formed from nonwoven fiber battings in which the fibers are bonded to hold together, but are generally not sufficiently stiff to be self-supporting. Typically, the fibers comprise continuous filaments or staple fibers of nylon, polyester, olefin, acrylic, or acetate. The fibers are preferably fusible, such that they become adhesive to each other upon application of heat or a solvent. If desired, the pocket can be stiffened by addition of adhesives or other suitable means, as would be known in the art.

The sheet media 60 comprising the spacing member is formed from any suitably stiff sheet-like material. Preferably, the spacing member is sufficiently strong to retain its shape under pressure, thereby enhancing the ability to maintain the pocket in an open configuration and to prevent collapse of sections of the pocket, which would impede gas flow through the filter. The sheet media can be, for example, spun bonded or carded nonwovens of, for example, polyester, polypropylene, or mixtures thereof, or polyamide. Other fibers, such as described above for the filter media, can also be used.

Figure 1:
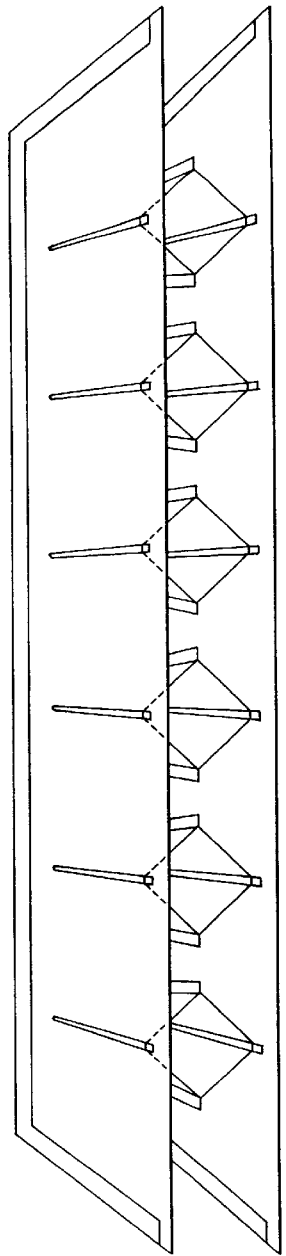
FIG. 1 is a partially exploded perspective view of a prior art pocket assembly.

The spacing member of the present invention imparts more stiffness to the pocket filter assembly than does the prior art pocket filter of the type shown in FIG. 1, since the cross pieces 37 of the present spacing member provide more resistance to collapse of the filter media against each other than does the tube shape of the prior art spacers. Additionally, the spacing member of the present invention provides a more laminar flow of gas through the pockets, leading to a more uniform loading of particulates, and minimizes flutter of the pockets, which could lead to premature failure of the filter assembly. This is a benefit especially in industrial applications involving high flow rates.

Further, more cross pieces 37 of the present spacing member can fit within a given pocket width than can the tube shaped spacers of the prior art. For example, comparing FIGS. 1 and 2, a given pocket width which can readily accommodate eight cross pieces of the spacing member of the present invention can readily accommodate only six prior art tube shaped spacers. The greater number of cross pieces provides additional stiffness to the pocket assembly.

The invention is not to be limited by what has been particularly shown and described except as indicated by the appended claims.

I claim:

1. A spaced pocket filter assembly comprising:
   a holding frame;
   at least one filter pocket comprising a first sheet of gas permeable filter media and a second sheet of gas permeable filter media, the first and second sheets sealed together along a portion of a periphery to form a pocket configuration, a remaining portion of the periphery open to form a pocket mouth, the filter pocket secured to the holding frame at the pocket mouth with the pocket mouth open;
   a spacing member formed of a third sheet media folded alternately along a plurality of parallel fold lines to provide a Z or zig zag configuration, the spacing member disposed within the filter pocket with the folds extending from proximate the pocket mouth to proximate a sealed portion of the periphery opposite the pocket mouth and secured to the filter pocket along the fold lines; and a flow path defined by the filter pocket and the spacing member from the open pocket mouth to the sealed portion of the periphery opposite the pocket mouth.

2. The spaced pocket filter assembly of claim 1, wherein the holding frame is formed of a plastic material and the mouth of the filter pocket is molded within the plastic material.

3. The spaced pocket filter assembly of claim 1, wherein the holding frame has a generally rectangular configuration.

4. The spaced pocket filter assembly of claim 1, wherein the spacing member is secured to the filter pocket by ultrasonic welding, radio frequency welding, heat welding, or vibration welding.

5. The spaced pocket filter assembly of claim 1, further comprising a plurality of filter pockets secured to the holding frame, and a plurality of spacing members each formed of a single sheet media folded alternately along a plurality of parallel fold lines to provide a Z or zig zag configuration, each spacing member disposed within an associated one of the plurality of filter pockets and secured to the associated filter pocket along the fold lines.

6. The spaced pocket filter assembly of claim 1, wherein the first, and second filter media comprise sheets of nonwoven fibers.

7. The spaced pocket filter assembly of claim 1, wherein the third sheet media of the spacing member is sufficiently strong to retain a shape of the third sheet media under pressure.

8. The spaced pocket filter assembly of claim 1, wherein the third sheet media of the spacing member is formed from a spun bonded or carded nonwoven material.

9. The spaced pocket filter assembly of claim 1, wherein the fold lines of the spacing member secured to the filter pocket extend to the pocket mouth, areas of the third sheet media intermediate the fold lines being spaced away from the pocket mouth.

10. A process for making a spaced pocket filter assembly comprising:

providing a first roll of a first gas permeable filter media and a second roll of a second gas permeable filter media;

providing a third roll of a third sheet media disposed intermediate the first and second rolls of filter media;

unrolling the third sheet of spacing media from the third roll and folding the spacing media longitudinally alternately to provide a Z or zig zag configuration;

unrolling the first filter media and the second filter media and layering the spacing media in the folded configuration between the first filter media and the second filter media;

securing the spacing media to the first filter media and the second filter media along the fold lines;

securing the first filter media and the second filter media together along longitudinal side edges;

securing the first filter media and the second filter media together at spaced locations along transverse lines;

severing the first, second, and spacing media transversely adjacent to the transverse lines to provide separated pocket assemblies; and securing an open mouth of the separated pocket assemblies to a holding frame.

11. The process of claim 10, wherein the open mouths of the separated pocket assemblies are secured to the associated holding frames by insert molding.

12. The process of claim 10, wherein the spacing media is secured to the first filter media and the second filter media along the fold lines by ultrasonic welding, radio frequency welding, heat welding, or vibration welding.

13. The process of claim 10, wherein the first filter media and the second filter media are sealed together by ultrasonic welding, radio frequency welding, heat welding, or vibration welding.

* * * * *